(12) United States Patent
Grafi

(10) Patent No.: US 10,331,890 B2
(45) Date of Patent: *Jun. 25, 2019

(54) DISARMING MALWARE IN PROTECTED CONTENT

(71) Applicant: VOTIRO CYBERSEC LTD., Tel-Aviv (IL)

(72) Inventor: Aviv Grafi, Ramat Gan (IL)

(73) Assignee: VOTIRO CYBERSEC LTD., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,484

(22) Filed: Mar. 20, 2018

(65) Prior Publication Data

US 2018/0268143 A1 Sep. 20, 2018

Related U.S. Application Data

(60) Provisional application No. 62/473,902, filed on Mar. 20, 2017.

(51) Int. Cl.
*G06F 12/14* (2006.01)
*G06F 21/56* (2013.01)
(Continued)

(52) U.S. Cl.
CPC ............ *G06F 21/568* (2013.01); *G06F 21/54* (2013.01); *G06F 21/563* (2013.01); *G06F 21/602* (2013.01); *G06F 21/6209* (2013.01)

(58) Field of Classification Search
None
See application file for complete search history.

(56) References Cited

U.S. PATENT DOCUMENTS

| 4,654,484 A | 3/1987 | Reiffel et al. |
| 5,164,839 A | 11/1992 | Lang |

(Continued)

FOREIGN PATENT DOCUMENTS

WO   WO 2011014623   2/2011

OTHER PUBLICATIONS

YazamTech, captured on Aug. 22, 2010, https://web.archive.org/web/20100822155839/http://yazamtech.com:80/en, 3 pages.

(Continued)

*Primary Examiner* — Brandon S Hoffman
(74) *Attorney, Agent, or Firm* — Finnegan, Henderson, Farabow, Garrett & Dunner, LLP

(57) ABSTRACT

Systems and methods of disarming malicious code in protected content in a computer system having a processor are provided. The method includes determining that a received input file intended for a recipient is protected, the recipient may be connected to a network; accessing a credential associated with the intended recipient for accessing the protected input file; accessing the content of the protected input file based on the credential; modifying at least a portion of digital values of the content of the input file configuring to disable any malicious code included in the input file, thereby creating a modified input file; and protecting the modified input file based on the credential associated with the intended recipient. The method also includes forwarding the protected modified input file to the intended recipient in the network.

23 Claims, 3 Drawing Sheets

(51) Int. Cl.
  *G06F 21/60* (2013.01)
  *G06F 21/54* (2013.01)
  *G06F 21/62* (2013.01)

(56) References Cited

U.S. PATENT DOCUMENTS

| | | | |
|---|---|---|---|
| 6,324,334 | B1 | 11/2001 | Morioka et al. |
| 7,185,017 | B1 | 2/2007 | Cauvin et al. |
| 7,263,561 | B1 | 8/2007 | Green et al. |
| 7,797,743 | B2 | 9/2010 | Treacy et al. |
| 8,180,837 | B2 | 5/2012 | Lu et al. |
| 8,185,954 | B2 | 5/2012 | Scales |
| 8,316,459 | B2 | 11/2012 | Shani |
| 8,533,824 | B2 | 9/2013 | Hutton |
| 8,745,742 | B1 | 6/2014 | Satish et al. |
| 8,763,128 | B2 | 6/2014 | Lim et al. |
| 8,869,283 | B2 | 10/2014 | Scales |
| 9,038,174 | B2 | 5/2015 | Hutton |
| 9,047,293 | B2 | 6/2015 | Grafi et al. |
| 9,330,264 | B1 | 5/2016 | Hutton |
| 9,516,045 | B2 | 12/2016 | Scales |
| 9,582,665 | B2 | 2/2017 | Eytan et al. |
| 9,832,223 | B2 | 11/2017 | Eytan et al. |
| 9,946,877 | B2 | 4/2018 | Eytan et al. |
| 9,977,901 | B2 | 5/2018 | Eytan et al. |
| 2003/0229810 | A1 | 12/2003 | Bango |
| 2005/0149726 | A1* | 7/2005 | Joshi ............ G06F 21/51 713/164 |
| 2005/0257045 | A1* | 11/2005 | Bushman .......... G06Q 20/02 713/156 |
| 2007/0056035 | A1 | 3/2007 | Copley |
| 2007/0087766 | A1 | 4/2007 | Hardy et al. |
| 2008/0209551 | A1 | 8/2008 | Treacy et al. |
| 2009/0150419 | A1 | 6/2009 | Kim et al. |
| 2009/0282484 | A1 | 11/2009 | Wiseman et al. |
| 2010/0115620 | A1 | 5/2010 | Alme |
| 2011/0083181 | A1* | 4/2011 | Nazarov ............ G06F 21/562 726/23 |
| 2012/0167206 | A1 | 6/2012 | Reetz-Lamour et al. |
| 2013/0081065 | A1 | 3/2013 | Sharan et al. |
| 2016/0191531 | A1 | 6/2016 | Perlmutter et al. |
| 2017/0353475 | A1 | 12/2017 | Hutton |
| 2018/0253554 | A1 | 9/2018 | Eytan et al. |

OTHER PUBLICATIONS

Products, YazamTech, captured on Aug. 23, 2010, https://web.archive.org/web/20100823005723/http://yazamtech.com:80/en/products, 3 pages.
YazamTech, captured on Oct. 7, 2010, https://web.archive.org/web/20101007160034/http://yazamtech.com:80/en?phpMyAdmin=2pTp23a-YBGPpnaPAXvSkgjFO71, 2 pages.
ShuttleIT, YazamTech, captured on Dec. 29, 2010, https://web.archive.org/web/20101229174141/http://yazamtech.com:80/en/shuttleit, 3 pages.
About Us, YazamTech, captured on Dec. 31, 2010, https://web.archive.org/web/20101231084709/http://yazamtech.com:80/en/about-us, 2 pages.
Contact Us, YazamTech, captured on Dec. 31, 2010, https://web.archive.org/web/20101231084713/http://yazamtech.com:80/en/contact, 1 page.
Distributors, YazamTech, captured on Dec. 31, 2010, https://web.archive.org/web/20101231123316/http://yazamtech.com:80/en/distributor_en, 2 pages.
Docs, YazamTech, captured on Dec. 31, 2010, https://web.archive.org/web/20101231123319/http://yazamtech.com:80/en/docs, 1 page.
Documentation, YazamTech, captured on Dec. 31, 2010, https://web.archive.org/web/20101231123344/http://yazamtech.com:80/en/documentation, 1 page.
InjectorIT, YazamTech, captured on Dec. 31, 2010, https://web.archive.org/web/20101231123352/http://yazamtech.com:80/en/injectorit, 2 pages.
Products, YazamTech, captured on Dec. 31, 2010, https://web.archive.org/web/20101231084723/http://yazamtech.com:80/en/products, 2 pages.
Research, YazamTech, captured on Dec. 31, 2010, https://web.archive.org/web/20101231123359/http://yazamtech.com:80/en/research, 1 page.
SelectorIT, YazamTech, captured on Dec. 31, 2010, https://web.archive.org/web/20101231084740/http://yazamtech.com:80/en/selectorit, 4 pages.
YazamTech, captured on Dec. 31, 2010, https://web.archive.org/web/20101231084707/http://yazamtech.com:80/en, 2 pages.
ShuttleIT, YazamTech, captured on Feb. 3, 2011, https://web.archive.org/web/20110203153113/http://yazamtech.com:80/en/shuttleit, 3 pages.
YazamTech, captured on Mar. 6, 2011, https://web.archive.org/web/20110306123449/http://yazamtech.com:80/en, 2 pages.
Products, YazamTech, captured on Mar. 15, 2011, https://web.archive.org/web/20110315193104/http://yazamtech.com:80/en/products, 2 pages.
Research, YazamTech, captured on Mar. 15, 2011, https://web.archive.org/web/20110315193112/http://yazamtech.com:80/en/research, 1 page.
White-listing Beyond Anti-Virus, YazamTech, captured on Mar. 15, 2011, https://web.archive.org/web/20110315175925/http://yazamtech.com:80/en/white-listing-beyond-anti-virus, 1 page.
White-listing Server or Station, YazamTech, captured on Mar. 15, 2011, https://web.archive.org/web/20110315193118/http://yazamtech.com:80/en/white-listing-server-or-station, 1 page.
YazamTech, captured on Mar. 15, 2011, https://web.archive.org/web/20110315193058/http://yazamtech.com/en, 2 pages.
A single ShuttleIT system can now handle multiple directories, YazamTech, captured on Sep. 27, 2013, https://web.archive.org/web/20130927194536/http://yazamtech.com/en/single-shuttleit-system-can-now-handle-multiple-directories, 1 page.
About Us, YazamTech, captured on Sep. 27, 2013, https://web.archive.org/web/20130927194226/http://yazamtech.com/en/about-us, 3 pages.
ActualIT, YazamTech, captured on Sep. 27, 2013, https://web.archive.org/web/20130927194433/http://yazamtech.com/en/actualit, 2 pages.
ActualIT, YazamTech, captured on Sep. 27, 2013, https://web.archive.org/web/20130927195119/http://yazamtech.com/en/actualit-1, 1 page.
Contact Us, YazamTech, captured on Sep. 27, 2013, https://web.archive.org/web/20130927194337/http://yazamtech.com/en/contact, 1 page.
Distributors, YazamTech, captured on Sep. 27, 2013, https://web.archive.org/web/20130927195025/http://yazamtech.com/en/distributor_en, 1 page.
Docs, YazamTech, captured on Sep. 27, 2013, https://web.archive.org/web/20130927194307/http://yazamtech.com/en/docs, 1 page.
File Slack, YazamTech, captured on Sep. 27, 2013, https://web.archive.org/web/20130927195132/http://yazamtech.com/en/file-slack, 1 page.
Frequently Asked Questions—English, YazamTech, captured on Sep. 27, 2013, https://web.archive.org/web/20130927195242/http://yazamtech.com/en/category/faq/english, 2 pages.
Frequently Asked Questions—English, YazamTech, captured on Sep. 27, 2013, https://web.archive.org/web/20130927195230/http://yazamtech.com/en/faq/english, 3 pages.
Frequently Asked Questions, YazamTech, captured on Sep. 27, 2013, https://web.archive.org/web/20130927195218/http://yazamtech.com/en/faq, 3 pages.
InjectorIT allows the usage of a secure server, YazamTech, captured on Sep. 27, 2013, https://web.archive.org/web/20130927194459/http://yazamtech.com/en/injectorit-allows-usage-secureserver, 1 page.
New Features in SelectorIT 1.1.0, YazamTech, captured on Sep. 27, 2013, https://web.archive.org/web/20130927194511/http://yazamtech.com/en/new-features-selectorit-110, 1 page.
Products, YazamTech, captured on Sep. 27, 2013, https://web.archive.org/web/20130927194241/http://yazamtech.com/en/products, 1 page.
Research, YazamTech, captured on Sep. 27, 2013, https://web.archive.org/web/20130927194321/http://yazamtech.com/en/research, 1 page.

(56) References Cited

OTHER PUBLICATIONS

SelectorIT, YazamTech, captured on Sep. 27, 2013, https://web.archive.org/web/20130927195041/http://yazamtech.com/en/selectorit-0, 1 page.
SelectorIT, YazamTech, captured on Sep. 27, 2013, https://web.archive.org/web/20130927194123/http://yazamtech.com/en/selectorit, 4 pages.
SelectorIT, YazamTech, captured on Sep. 27, 2013, https://web.archive.org/web/20130927195012/http://yazamtech.com/en/selectorit?phpMyAdmin=2pTp23a-YBGPpnaPAXvSkgjFO71, 4 pages.
SelectorIT: a security solution beyond anti-virus, YazamTech, captured on Sep. 27, 2013, https://web.archive.org/web/20130927194524/http://yazamtech.com/en/selectorit-security-solution-beyond-anti-virus, 1 page.
ShuttleIT, YazamTech, captured on Sep. 27, 2013, https://web.archive.org/web/20130927195054/http://yazamtech.com/en/node/37, 1 page.
ShuttleIT, YazamTech, captured on Sep. 27, 2013, https://web.archive.org/web/20130927194354/http://yazamtech.com/en/node/9, 4 pages.
Updates, YazamTech, captured on Sep. 27, 2013, https://web.archive.org/web/20130927194253/http://yazamtech.com/en/updates_en, 1 page.
VectorIT, YazamTech, captured on Sep. 27, 2013, https://web.archive.org/web/20130927195108/http://yazamtech.com/en/injectorit-0, 1 page.
VectorIT, YazamTech, captured on Sep. 27, 2013, https://web.archive.org/web/20130927194948/http://yazamtech.com/en/vectorit, 3 pages.
White-listing Beyond Anti-Virus, YazamTech, captured on Sep. 27, 2013, https://web.archive.org/web/20130927195143/http://yazamtech.com/en/white-listing-beyond-anti-virus, 1 page.
White-listing Server or Station, YazamTech, captured on Sep. 27, 2013, https://web.archive.org/web/20130927195155/http://yazamtech.com/en/white-listing-server-or-station, 1 page.
YazamTech, captured on Sep. 27, 2013, https://web.archive.org/web/20130927193714/http://yazamtech.com/en, 2 pages.
Zip Bomb, YazamTech, captured on Sep. 27, 2013, https://web.archive.org/web/20130927195206/http://yazamtech.com/en/zip-bomb, 1 page.
YazamTech, captured on Jan. 7, 2014, https://web.archive.org/web/20140107212727/http://yazamtech.com/en, 2 pages.
YazamTech, captured on Jan. 11, 2014, https://web.archive.org/web/20140111182504/http://yazamtech.com/en, 2 pages.
About Us, YazamTech, captured on Jan. 24, 2014, https://web.archive.org/web/20140124145938/http://yazamtech.com/en/about-us, 3 pages.
Distributors, YazamTech, captured on Jan. 24, 2014, https://web.archive.org/web/20140124145954/http://yazamtech.com/en/distributor_en, 1 page.
VectorIT, YazamTech, captured on Jan. 25, 2014, https://web.archive.org/web/20140125221917/http://yazamtech.com/en/vectorit, 3 pages.
YazamTech, captured on Jan. 25, 2014, https://web.archive.org/web/20140125161656/http://yazamtech.com/en, 2 pages.
Contact Us, YazamTech, captured on Jan. 27, 2014, https://web.archive.org/web/20140127013125/http://yazamtech.com/en/contact, 1 page.
Docs, YazamTech, captured on Jan. 27, 2014, https://web.archive.org/web/20140127013132/http://yazamtech.com/en/docs, 1 page.
Research, YazamTech, captured on Jan. 27, 2014, https://web.archive.org/web/20140127013151/http://yazamtech.com/en/research, 1 page.
Updates, YazamTech, captured on Jan. 27, 2014, https://web.archive.org/web/20140127013214/http://yazamtech.com/en/updates_en, 1 page.
A single ShuttleIT system can now handle multiple directories, YazamTech, captured on Aug. 1, 2014, https://web.archive.org/web/20140801204953/http://yazamtech.com/en/single-shuttleit-system-can-now-handle-multiple-directories, 1 page.
About Us, YazamTech, captured on Aug. 1, 2014, https://web.archive.org/web/20140801204634/http://yazamtech.com/en/about-us, 3 pages.
ActualIT, YazamTech, captured on Aug. 1, 2014, https://web.archive.org/web/20140801204843/http://yazamtech.com/en/actualit, 2 pages.
ActualIT, YazamTech, captured on Aug. 1, 2014, https://web.archive.org/web/20140801205619/http://yazamtech.com/en/actualit-1, 1 page.
Contact Us, YazamTech, captured on Aug. 1, 2014, https://web.archive.org/web/20140801204744/http://yazamtech.com/en/contact, 1 page.
Distributors, YazamTech, captured on Aug. 1, 2014, https://web.archive.org/web/20140801205513/http://yazamtech.com/en/distributor_en, 1 page.
Docs, YazamTech, captured on Aug. 1, 2014, https://web.archive.org/web/20140801204715/http://yazamtech.com/en/docs, 1 page.
File Slack, YazamTech, captured on Aug. 1, 2014, https://web.archive.org/web/20140801205632/http://yazamtech.com/en/file-slack, 1 page.
Frequently Asked Questions—English, YazamTech, captured on Aug. 1, 2014, https://web.archive.org/web/20140801205754/http://yazamtech.com/en/category/faq/english, 2 pages.
Frequently Asked Questions—English, YazamTech, captured on Aug. 1, 2014, https://web.archive.org/web/20140801205740/http://yazamtech.com/en/faq/english, 3 pages.
Frequently Asked Questions, YazamTech, captured on Aug. 1, 2014, https://web.archive.org/web/20140801205726/http://yazamtech.com/en/faq, 3 pages.
InjectorIT allows the usage of a secure server, YazamTech, captured on Aug. 1, 2014, https://web.archive.org/web/20140801204911/http://yazamtech.com/en/injectorit-allows-usage-secure-server, 1 page.
New Features in SelectorIT 1.1.0, YazamTech, captured on Aug. 1, 2014, https://web.archive.org/web/20140801204925/http://yazamtech.com/en/new-features-selectorit-110, 1 page.
Products, YazamTech, captured on Aug. 1, 2014, https://web.archive.org/web/20140801204646/http://yazamtech.com/en/products, 1 page.
Research, YazamTech, captured on Aug. 1, 2014, https://web.archive.org/web/20140801204731/http://yazamtech.com/en/research, 1 page.
SelectorIT, YazamTech, captured on Aug. 1, 2014, https://web.archive.org/web/20140801204521/http://yazamtech.com/en/selectorit, 4 pages.
SelectorIT, YazamTech, captured on Aug. 1, 2014, https://web.archive.org/web/20140801205500/http://yazamtech.com/en/selectorit?phpMyAdmin=2pTp23a-YBGPpnaPAXvSkgjFO71, 4 pages.
SelectorIT, YazamTech, captured on Aug. 1, 2014, https://web.archive.org/web/20140801205537/http://yazamtech.com/en/selectorit-0, 1 page.
SelectorIT: a security solution beyond anti-virus, YazamTech, captured on Aug. 1, 2014, https://web.archive.org/web/20140801204940/http://yazamtech.com/en/selectorit-security-solution-beyond-anti-virus, 1 page.
ShuttleIT, YazamTech, captured on Aug. 1, 2014, https://web.archive.org/web/20140801205552/http://yazamtech.com/en/node/37, 1 page.
ShuttleIT, YazamTech, captured on Aug. 1, 2014, https://web.archive.org/web/20140801204802/http://yazamtech.com/en/node/9, 4 pages.
Updates, YazamTech, captured on Aug. 1, 2014, https://web.archive.org/web/20140801204702/http://yazamtech.com/en/updates_en, 1 page.
VectorIT, YazamTech, captured on Aug. 1, 2014, https://web.archive.org/web/20140801205606/http://yazamtech.com/en/injectorit-0, 1 page.
VectorIT, YazamTech, captured on Aug. 1, 2014, https://web.archive.org/web/20140801205431/http://yazamtech.com/en/vectorit, 3 pages.
White-listing Beyond Anti-Virus, YazamTech, captured on Aug. 1, 2014, https://web.archive.org/web/20140801205647/http://yazamtech.com/en/white-listing-beyond-anti-virus, 1 page.
White-listing Server or Station, YazamTech, captured on Aug. 1, 2014, https://web.archive.org/web/20140801205659/http://yazamtech.com/en/white-listing-server-or-station, 1 page.
YazamTech, captured on Aug. 1, 2014, https://web.archive.org/web/20140801204051/http://yazamtech.com/en, 2 pages.
Zip Bomb, YazamTech, captured on Aug. 1, 2014, https://web.archive.org/web/20140801205712/http://yazamtech.com/en/zip-bomb, 1 page.
YazamTech, captured on Mar. 20, 2015, https://web.archive.org/web/20150320024752/http://www.yazamtech.com:80/en, 2 pages.
A single ShuttleIT system can now handle multiple directories, YazamTech, captured on Mar. 21, 2015, https://web.archive.org/web/20150321022719/http://www.yazamtech.com:80/en/single-shuttleit-system-can-now-handle-multiple-directories, 1 page.

(56) References Cited

OTHER PUBLICATIONS

About Us, YazamTech, captured on Mar. 21, 2015, https://web.archive.org/web/20150321060726/http://www.yazamtech.com:80/en/about-us, 3 pages.
ActualIT, YazamTech, captured on Mar. 21, 2015, https://web.archive.org/web/20150321022658/http://www.yazamtech.com:80/en/actualit, 2 pages.
InjectorIT allows the usage of a secure server, YazamTech, captured on Mar. 21, 2015, https://web.archive.org/web/20150321022704/http://www.yazamtech.com:80/en/injectorit-allows-usage-secure-server, 1 page.
New Features in SelectorIT 1.1.0, YazamTech, captured on Mar. 21, 2015, https://web.archive.org/web/20150321022709/http://www.yazamtech.com:80/en/new-features-selectorit-110, 1 page.
SelectorIT, YazamTech, captured on Mar. 21, 2015, https://web.archive.org/web/20150321060700/http://www.yazamtech.com:80/en/selectorit, 4 pages.
SelectorIT: a security solution beyond anti-virus, YazamTech, captured on Mar. 21, 2015, https://web.archive.org/web/20150321022714/http://www.yazamtech.com:80/en/selectorit-security-solution-beyond-anti-virus, 1 page.
ShuttleIT, YazamTech, captured on Mar. 21, 2015, https://web.archive.org/web/20150321060625/http://www.yazamtech.com:80/en/node/9, 4 pages.
Updates, YazamTech, captured on Mar. 21, 2015, https://web.archive.org/web/20150321022726/http://www.yazamtech.com:80/en/updates_en, 1 page.
VectorIT, YazamTech, captured on Mar. 21, 2015, https://web.archive.org/web/20150321060706/http://www.yazamtech.com:80/en/vectorit, 3 pages.
YazamTech, captured on Mar. 21, 2015, https://web.archive.org/web/20150321060721/http://www.yazamtech.com:80/en, 2 pages.
YazamTech, captured on Apr. 6, 2015, https://web.archive.org/web/20150406175817/http://www.yazamtech.com:80/en, 2 pages.
YazamTech, captured on Apr. 23, 2015, https://web.archive.org/web/20150423110533/http://www.yazamtech.com:80/en, 2 pages.
Updates, YazamTech, captured on Jun. 28, 2015, https://web.archive.org/web/20150628122651/http://www.yazamtech.com:80/en/updates_en, 1 page.
YazamTech, captured on Jun. 28, 2015, https://web.archive.org/web/20150628122630/http://www.yazamtech.com:80/en, 2 pages.
Products, YazamTech, captured on Jul. 1, 2015, https://web.archive.org/web/20150701010841/http://www.yazamtech.com:80/en/products, 1 page.
SelectorIT, YazamTech, captured on Jul. 2, 2015, https://web.archive.org/web/20150702095314/http://www.yazamtech.com:80/en/selectorit-0, 1 page.
YazamTech, captured on Jul. 11, 2015, https://web.archive.org/web/20150711093404/http://www.yazamtech.com:80/en, 2 pages.
Additional Products, YazamTech, captured on Aug. 30, 2016, https://web.archive.org/web/20160830010641/http://www.yazamtech.com/#!additional-products/cy7, 2 pages.
Company, YazamTech, captured on Aug. 30, 2016, https://web.archive.org/web/20160830010641/http://www.yazamtech.com/™!company/hl4mz, 1 page.
Contact us, YazamTech, captured on Aug. 30, 2016, https://web.archive.org/web/20160830010641/http://www.yazamtech.com/™!contact/c24vq, 1 page.
Distributors, YazamTech, captured on Aug. 30, 2016, https://web.archive.org/web/20160830010641/http://www.yazamtech.com/™!distributors/cohj, 2 pages.
FAQ, YazamTech, captured on Aug. 30, 2016, https://web.archive.org/web/20160830010641/http://www.yazamtech.com/#!faq/cirw, 1 page.
Which actions can be expected from the content filtering system?, YazamTech, captured on Aug. 30, 2016, https://web.archive.org/web/20160830010641/http://www.yazamtech.com/™!faqs-11/c148p, 1 page.
What are the advantages of YazamTech SelectorIT?, YazamTech, captured on Aug. 30, 2016, https://web.archive.org/web/20160830010641/http://www.yazamtech.com/#!faqs-12/c18iv, 1 page.
What are the YazamTech values?, YazamTech, captured on Aug. 30, 2016, https://web.archive.org/web/20160830010641/http://www.yazamtech.com/#!faqs-14/cg8a, 1 page.
Who are the applicable customers for YazamTech products?, YazamTech, captured on Aug. 30, 2016, https://web.archive.org/web/20160830010641/http://www.yazamtech.com/#!faqs-15/c1xmc, 1 page.
Home, YazamTech, captured on Aug. 30, 2016, https://web.archive.org/web/20160830010641/http://www.yazamtech.com/, 2 pages.
YazamTech Updates, YazamTech, captured on Aug. 30, 2016, https://web.archive.org/web/20160830010641/http://www.yazamtech.com/™!new-post-updates-page/c1gp0, 4 pages.
Our Team, YazamTech, captured on Aug. 30, 2016, https://web.archive.org/web/20160830010641/http://www.yazamtech.com/#!our_team/cqn6, 2 pages.
Products, YazamTech, captured on Aug. 30, 2016, https://web.archive.org/web/20160830010641/http://www.yazamtech.com/#!products/c5ro, 2 pages.
SelectorIT, YazamTech, captured on Aug. 30, 2016, https://web.archive.org/web/20160830010641/http://www.yazamtech.com/™!selectorit/ccz3, 1 page.
ShuttleIT, YazamTech, captured on Aug. 30, 2016, https://web.archive.org/web/20160830010641/http://www.yazamtech.com/™!shuttelit/cv2j, 1 page.
Solutions, YazamTech, captured on Aug. 30, 2016, https://web.archive.org/web/20160830010641/http://www.yazamtech.com/™!solutions/c1mbk, 2 pages.
MetaDefender Email Security—4.7 Support for password protected attachments, OPSWAT, retrieved Sep. 27, 2018, https://onlinehelp.opswat.com/emailv4/4.7_Support_for_password_protected_attachments.html, 9 pages.
National Security Agency, "Hidden Data and Metadata in Adobe PDF Files: Publication Risks and Countermeasures" (Jul. 27, 2008)
English Translation of בלמ"ס (Hebrew-language document A), 14 pages.
English Translation of Selector IT בדיקות ביטחון למערכת הלבנה דו"ח (Hebrew-language document B), 8 pages.

\* cited by examiner

DISARMING MALWARE IN PROTECTED CONTENT

PRIORITY CLAIM

This disclosure claims priority under 35 U.S.C. § 119 to U.S. provisional patent application No. 62/473,902 filed on Mar. 20, 2017, which is incorporated herein by reference in its entirety.

BACKGROUND

Malware-based attacks pose significant risks to computer systems. Malware includes, for example, any malicious content, code, scripts, active content, or software designed or intended to damage, disable, or take control over a computer or computer system. Examples of malware include computer viruses, worms, trojan horses, ransomware, spyware, shellcode, etc. Malware may be received into a computer system in various ways, commonly through electronic communications such as email (and its attachments) and downloads from websites. Computer systems are known to implement various protective tools at end-user computer devices and/or gateways or access points to the computer system for screening or detecting malicious content before the malicious content is allowed to infect the computer system. Conventional tools commonly rely on the ability to identify or recognize a particular malicious threat or characteristics known to be associated with malicious content or activity.

For example, common attempts to identify malicious content include screening incoming documents at a host computer or server based on a comparison with known malicious signatures. Such signature-based malware detection techniques, however, are incapable of identifying malicious content for which a malicious signature has not yet been identified. Accordingly, it is generally not possible to identify new malicious content or subtle variations of existing malicious content using signature-based detection methods. Furthermore, in many cases, malicious content is embedded in otherwise legitimate content, documents or files having proper structure and characteristics, and the malicious content may also be disguised to hide the malicious nature of the content, so that the malicious content appears to be innocuous. Thus, even upon inspection of a document according to known malware scanning techniques, it may be difficult to identify malicious content.

Other conventional tools for identifying malicious content implement behavior-based techniques or heuristics to identify characteristics of known malicious content or other suspicious activity or behavior. One such technique implements a "sandbox," (e.g., a type of secured, monitored, or virtual operating system environment) which can be used to execute untested or untrusted programs, files, or code in a manner that eliminates or reduces risk of harm to a host machine or operating system. That is, conventional sandbox techniques may execute or detonate a file while monitoring the damage or operations post-detonation. Some operations that may be monitored included operations for writing to disk, initiating network activity, the spawning of new processes and any other potentially suspicious operations. These techniques, however, also suffer from the inability to identify new yet-to-be-identified exploits, e.g., so called zero-day exploits. Some sophisticated malware have also been developed to evade such "sandbox" techniques by halting or skipping if it detects that it is running in such a virtual execution or monitored environment. Furthermore, hackers typically evolve their code to include delayed or staged attacks that may not be detected from evaluation of a single file, for example, or may lay in wait for a future unknown process to complete an attack. Thus, in some situations it may be too computationally intensive or otherwise impracticable to identify some malware exploits using conventional sandbox techniques.

Other tools that help overcome limitations of conventional malware detection techniques have recently been implemented and include those based on a concept of content disarm and reconstruction (CDR), or content sanitization, which generally refers to techniques for analyzing or deconstructing content, removing aspects of the content that pose risks, and reconstructing the content to be at least partly usable by an end user. Other techniques exist for changing a format of the content, for example, to hopefully destroy any malicious content that may be part of the received content. Such CDR techniques aim to remove or disarm any malicious content that may be included in content. Some CDR processes result in the creation of modified content, or content that differs in one or more ways from the content entering a computer system on which a CDR technique is performed. In some systems, use of a CDR technique creates a modified file. Because some CDR techniques do not necessarily require prior detection of malicious content in the received content, these techniques may provide an advantage for protecting computer systems from yet-to-be identified attacks.

While in some cases it may be advantageous to perform a CDR process on all content received by or entering a computer system to prevent malicious content from infecting the computer system, there are some significant use cases where this may not be workable. For example, some computer systems may receive a significant volume of protected content as part of its regular course of business. Protected content may generally refer to any content that is encrypted or otherwise obscured or prevented from being accessed based on one or more controls placed on the content. Because existing CDR techniques require access to the underlying digital content, such techniques are ineffective when the received content is protected. And any sort of selective CDR processing of protected content also risks harm to the system because of potential mistakes in the selection process.

The challenges posed by protected content are exacerbated where the CDR technique is performed at a gateway to a computer system or some other device other than an end-user client device. Similar problems also exist for conventional tools for identifying malicious content, such as the signature-based and behavior-based techniques mentioned above.

Current techniques and systems do not provide capabilities for protecting computer systems from malicious content included in protected content. Thus, there is a need in computer systems for techniques to mitigate the risks posed by malware attacks included in protected content. There is also a need for using a CDR process for protected content, while attaining the benefits and goals for protecting the content.

SUMMARY

In the following description certain aspects and embodiments of the present disclosure will become evident. It should be understood that the disclosure, in its broadest sense, could be practiced without having one or more features of these aspects and embodiments. It should also be understood that these aspects and embodiments are examples only.

The disclosed embodiments include a method for disarming malicious code in protected content. The method may be performed by a processor of a computer system and includes operations for determining that a received input file intended for a recipient is protected, accessing a credential associated with the intended recipient for accessing the protected input file, accessing the content of the protected input file based on the credential, modifying at least a portion of digital values of the content configuring to disable any malicious code included in the content, thereby creating a modified input file, and protecting the modified input file based on the credential associated with the intended recipient. In some embodiments, the protected, modified input filed may be forwarded to the intended recipient. The intended recipient may be associated with a device that receives the input file. Further, this device may in some configurations be connected to a network.

The disclosed embodiments include another method for disarming malicious code in protected content in a computer system. The method includes operations for determining that a received content intended for a (e.g., networked) recipient is protected, accessing a credential for accessing the protected content, accessing the digital values of the protected content based on the credential, modifying at least a portion of the digital values of the content configuring to disable any malicious code included in the content, thereby creating modified content, and enabling access to the modified content by the intended recipient. In some embodiments, the modified content may be protected based on the credential before enabling access to the modified content. In some embodiments, the modified content may be forwarded to the intended recipient.

The disclosed embodiments also include a method for protecting computer systems from malicious code included in protected content in a computer system. The method includes operations for determining that a received content intended for a recipient in a network is protected, accessing a credential for accessing the protected content, determining whether the digital values of the protected content include suspected malicious content, and when no suspected malicious content is detected, enabling access to the protected content. In some embodiments, the content may be re-protected based on the credential or another credential before enabling access to the protected content.

In accordance with additional embodiments of the present disclosure, a computer-readable medium is disclosed that stores instructions that, when executed by a processor(s), causes the processor(s) to perform operations consistent with one or more disclosed methods.

The disclosed embodiment also include a system for protecting a computer system from malicious code included in protected content or disarming malicious code in protected content. The system includes a memory device storing a set of instructions, and a processor configured to execute the set of instructions to perform operations consistent with one or more disclosed methods.

It is to be understood that both the foregoing general description and the following detailed description are by example and explanatory only, and are not restrictive of the disclosed embodiments, as claimed.

BRIEF DESCRIPTION OF THE DRAWINGS

The subject matter regarded as the invention is particularly pointed out and distinctly claimed in the concluding portion of the specification. The disclosed principles, however, both as to organization and method of operation, together with objects, features, and advantages thereof, may best be understood by reference to the following detailed description when read with the accompanying drawings in which:

Figure 1:
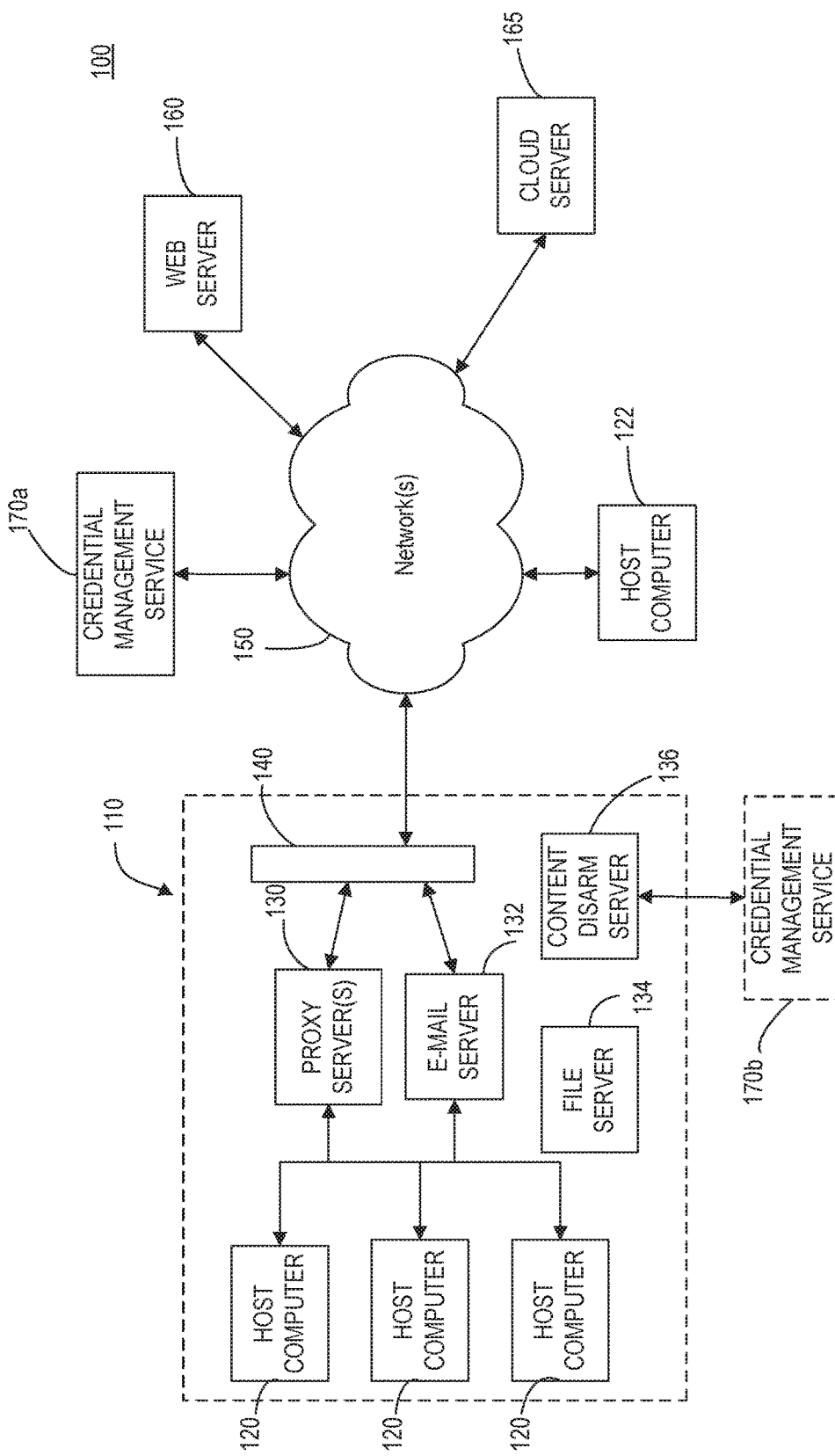
FIG. 1 is a schematic block diagram of an example computing environment consistent with the disclosed embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence. Additionally, some of the described embodiments or elements thereof can occur or be performed simultaneously, at the same point in time, or concurrently.

One technique hackers use to obtain control of a victim computer or computing environment is through the execution of malicious code at the victim computer or computing environment using malicious content received into a computer system via electronic files and electronic communications, such as via email, for example. The malicious code may be any form of malware including computer viruses, worms, trojan horses, ransomware, spyware, shellcode, etc. The disclosed embodiments may implement techniques for disarming, sanitizing, or otherwise preventing malicious content from entering a computer system via received electronic content. In the disclosed embodiments, any (or all) input content received by a computer system may be modified or transformed to thereby generate modified input content in which any malicious code included in the input content is excluded, disarmed, or otherwise prevented from causing its intended malicious effects. The modified input content may then be sent to an intended recipient instead of the original input content or until the original input content may be deemed safe for releasing to the intended recipient. In some embodiments, the original input content may be stored in a protective storage area and thus may be considered to be quarantined in the computer system, such that any malicious content in the original input content is unable to attack the computer system.

The disclosed embodiments implement techniques for creating modified content from received original content that has been protected (e.g., encrypted or otherwise obscured or prevented from being accessed based on one or more controls placed on the content). The disclosed embodiments also implement techniques for re-protecting the modified content to thus realize some of the same benefits for the modified content as the protected original content. Each of the disclosed embodiments need not provide all the same benefits for the modified content that the original protection provides. Additionally, each of the disclosed embodiments need not necessarily create modified content from the received original content that has been protected.

In some embodiments, protected content may be formed by encrypting original content and/or password protecting the original content or otherwise protecting the content, such that the digital values of the original content (and any malicious code included therein) are not readily accessible without first unprotecting the content. Protected content may be formed by any of a number of known software applications for protecting or intending to secure electronic communications, messages, and files. For example, known word processing applications and pdf applications include capabilities for encrypting or password protecting files. Known electronic messaging applications and file transfer applications also include capabilities for encrypting or password protecting communications or files. Any one or more techniques for protecting content may be used. Thus, the disclosed embodiments may be implemented according to any particular content protection technique.

In some embodiments, before analyzing received content for suspected malicious content or before performing any modification of the received content, it may be necessary to first decrypt or unprotect the received content using a credential capable for this purpose.

In some embodiments, a credential may be based on a public key infrastructure (PM) system that is built on the concept of asymmetric cryptography, which includes a private, secret key and a public key that corresponds to the private key. A principle of asymmetric private/public key cryptography is that anyone can use the public key to decrypt something encrypted with the private key. The ability to decrypt a message using a public key can verify the sender of the content assuming the private key is kept secured and is verifiable as belonging to a particular sender. Likewise, a private key can be used to decrypt something encrypted with a public key. Encryption using a public key can ensure that only a holder of the private key can access the encrypted content.

In other embodiments, a credential may include a shared secret, such as a password, token, symmetric key, or the like, or be based on or derivable from such a shared secret. In such embodiments, a sender and recipient of the content may share knowledge of the credential (or other information for determining the credential) used to protect the original content. In the disclosed embodiments, the knowledge of the credential (or other information for determining the credential) may be shared and predetermined according to any techniques known in the art.

The disclosed embodiments also implement techniques for tracking the protected content or other types of content received by the computer system, and associating the content (or copies or characteristics thereof) either protected or unprotected with any respective generated modified content that may be passed on to an intended recipient. The original content (protected and/or unprotected) may be quarantined in the computer system or otherwise prevented from being received or accessed by an intended recipient, so that malicious content that may be included in the content is unable to infect the computer system. Because the disclosed embodiments may associate protected content with respective modified content, the disclosed techniques also enable a computer system to produce the original protected content upon demand, if needed, such as with respect to a legal proceeding or for any other purpose for which the original protected content is requested.

The disclosed embodiments may be associated with or provided as part of a data sanitization or CDR process for sanitizing or modifying electronic content, including electronic mail or files or documents or web content received at a victim computer or a computer system, such as via e-mail or downloaded from the web, etc. The disclosed embodiments may implement any one or more of several CDR techniques applied to received content based on the type of content, for example, or other factors. Some example CDR techniques that may be implemented together with the disclosed embodiments include document reformatting or document layout reconstruction techniques, such as those disclosed in U.S. Pat. No. 9,047,293, for example, the content of which is expressly incorporated herein by reference. Additional example CDR techniques include those for altering values of digital content, such as those disclosed in copending U.S. patent application Ser. Nos. 15/441,860 and 15/441,904, filed Feb. 24, 2017, and techniques for preventing automatic execution of active content, such as that disclosed in U.S. application Ser. No. 15/616,577, filed Jun. 7, 2017, the contents of all of which are also expressly incorporated herein by reference in their entirety.

The disclosed embodiments may implement one or more CDR processes to generate the modified input content without regard to whether malicious content is detected in the input content and without regard to whether the original input content is even analyzed by one or more malware detection techniques. The content disarming or sanitization techniques of the disclosed embodiments thus may prevent malware infection without malware detection. In some embodiments, however, one or more malware detection techniques may be implemented in association with receiving input content and generating modified input content. In some embodiments, one or more malware detection techniques may be implemented without generating modified input content.

Reference is now made to FIG. 1, which is a block diagram of an example computing environment 100, consistent with example embodiments of the present disclosure. As shown, system 100 may include a plurality of computing systems interconnected via one or more networks 150. A first network 110 may be configured as a private network. The first network 110 may include a plurality of host computers 120, one or more proxy servers 130, one or more e-mail servers 132, one or more file servers 134, a content disarm server 136, and a firewall 140. In some embodiments, first network 110 may optionally include a credential management service 170*b*, which may be part of or collocated with other elements of network 110 or otherwise connected to network 110, such as via content disarm server 136, as shown for example Any of proxy server 130, e-mail server 132, or firewall 140 may be considered an edge or gateway network device that interfaces with a second network, such as network 150. In some embodiments, content disarm server 136 may be configured as an edge or gateway device. When either of these elements are configured to implement one or more security operations for network 110, it may be referred to as a security gateway device. Host computers 120 and other computing devices of first network 110 may be capable of communicating with one or more web servers 160, cloud servers and other host computers 122 via one or more additional networks 150.

Networks 110 and 150 may comprise any type of computer networking arrangement used to exchange data among a plurality of computing components and systems. Network 110 may include a single local area network or a plurality of distributed interconnected networks and may be associated with a firm or organization, or a cloud storage service. The interconnected computing systems of network 110 may be within a single building, for example, or distributed throughout the United States and globally. Network 110, thus, may include one or more private data networks, a virtual private network using a public network, one or more LANs or WANs, and/or any other suitable combination of one or more types of networks, secured or unsecured.

Network(s) 150 may comprise any type of computer networking arrangement for facilitating communication between devices of the first network 110 and other distributed computing components such as web servers 160, cloud servers 165, credential management service 170a, or other host computers 122. Web servers 160 and cloud servers 165 may include any configuration of one or more servers or server systems interconnected with network 150 for facilitating communications and transmission of content or other data to the plurality of computing systems interconnected via network 150. In some embodiments, cloud servers 165 may include any configuration of one or more servers or server systems providing content or other data specifically for the computing components of network 110. Network 150 may include the Internet, a private data network, a virtual private network using a public network, a Wi-Fi network, a LAN or WAN network, and/or other suitable connections that may enable information exchange among various components of system 100. Network 150 may also include a public switched telephone network ("PSTN") and/or a wireless cellular network.

Host computers 120 and 122 may include any type of computing system configured for communicating within network 110 and/or network 150. Host computers 120, 122 may include, for example, a desktop computer, laptop computer, tablet, smartphone and any other network connected device such as a server, server system, printer, as well as other networking components.

File server 134 may include one or more file servers, which may refer to any type of computing component or system for managing files and other data for network 110. In some embodiments, file server 134 may include a storage area network comprising one or more servers or databases, or other configurations known in the art.

Content disarm server 136 may include one or more dedicated servers or server systems or other computing components or systems for performing aspects of the example processes including disarming and modifying input content. Accordingly, content disarm server 136 may be configured to perform aspects of a CDR solution, as well as perform other known malware mitigation techniques. Content disarm server 136 may be provided as part of network 110, as shown, or may be accessible to other computing components of network 110 via network 150, for example. In some embodiments, some or all of the functionality attributed to content disarm server 136 may be performed in a host computer 120. Content disarm server 136 may be in communication with any of the computing components of first network 110, and may function as an intermediary system to receive input content, including input electronic files and web content, from proxy server 130, e-mail server 132, file server 134, host computer 120, or firewall 140 and return, forward, or store a modified input file or modified input content according to the example embodiments. In some embodiments, content disarm server 136 may be configured as a security gateway and/or an edge device to intercept electronic communications entering a network.

Content disarm server 136 may also be configured to perform one or more malware detection algorithms, such as a blacklist or signature-based malware detection algorithm, or other known behavior-based algorithms or techniques for detecting malicious activity in a monitored run environment, such as a "sandbox," for example. Accordingly, content disarm server 136 may include or may have access to one or more databases of malware signatures or behavioral characteristics, or one or more blacklists of known malicious URLs, or other similar lists of information (e.g., IP addresses, hostnames, domains, etc.) associated with malicious activity. Content disarm server 136 may also access one or more other service providers that perform one or more malware detection algorithms as a service. In some embodiments, one or more malware detection algorithms may be implemented together with the disclosed techniques to detect any malicious content included in input content. For example, one or more malware detection algorithms may be implemented to first screen input content for known malicious content, whereby the example embodiments are then implemented to disarm any malicious content that may have been included in the input content and that may not have been detected by the one or more malware detection algorithms. Likewise, content disarm server 136 may also be configured to perform one or more algorithms on received input content for identifying suspicious content.

In some embodiments, content disarm server 136 and or file server 134 may include a dedicated repository for storing original input content (and/or characteristics thereof) (protected or otherwise) received by content disarm server 136. The dedicated repository may be restricted from general access by users or computers of network 110. The dedicated repository may be a protected storage or storage area that may prevent any malicious content stored therein from attacking other computing devices of the computer system. In some embodiments, all or select original input content (protected or otherwise) may be stored in the dedicated repository for a predetermined period of time or according to a policy of a network administrator, for example. In some embodiments, characteristics associated with the original input content, such as a hash of an input content file, or a URL of requested web content, or other identifiers, etc., may be stored in addition to or instead of the original input content. In those embodiments where the original input content is protected, the protected original content may be stored in addition to or instead of any subsequently unprotected original input content.

Proxy server 130 may include one or more proxy servers, which may refer to any type of computing component or system for handling communication requests between one or more interconnected computing devices of network 110. In some embodiments, proxy server 130 may be configured as one or more edge servers positioned between a private network of first network 110, for example, and public network 150.

E-mail server 132 may include one or more e-mail servers, which may refer to any type of computing component or system for handling electronic mail communications between one or more interconnected computing devices of network 110 and other devices external to network 110. In some embodiments, e-mail server 132 may be configured as one or more edge servers positioned between a private network of first network 110, for example, and public network 150.

First network 110 may also include one or more firewalls 140, implemented according to any known firewall configuration for controlling communication traffic between first network 110 and network 150. In some embodiments, firewall 140 may include an edge firewall configured to filter communications entering and leaving first network 110. Firewall 140 may be positioned between network 150 and one or more of proxy server 130 and e-mail server 132. In the embodiment shown, proxy server 130, e-mail server 132 and firewall 140 are positioned within first network 110, however, other configurations of network 110 are contemplated by the present disclosure. For example, in another embodiment, one or more of the proxy server 130, e-mail server 132 and firewall 140 may be provided external to the first network 110. Any other suitable arrangement is also contemplated. Additionally, other networking components, not shown, may be implemented as part of first network 110 or external to network 110 for facilitating communications within the first network 110 and with other external networks, such as network 150.

When original input content is protected, the disclosed embodiments may implement the functionality of a credential management service 170a and/or 170b. Credential management service 170a may include one or more entities or services that represent a credential management service accessible via network 150, for example, whereas credential management service 170b may include one or more third party entities or services that represent a credential management service dedicated to or associated with network 110 or otherwise trusted by network 110. Entrust Datacard Corp., for example, operates one such third party credential management service. In some embodiments, credential management service 170b may include an administrator of network 110 or may be controlled by an administrator of network 110. Credential management service 170a may be substantially similar to credential management service 170b, and in some embodiments, may represent the same service or set of services. In some embodiments, credential management service 170a may be part of a third party service associated with one or more software applications implemented for protecting the original input content, such as a service associated with an application for facilitating secure or protected communications between a sender and an intended recipient. Credential management services 170a and 170b may be any one or more services and/or entities providing functionality for managing or holding a credential or secret or some other information for deriving a credential or a secret that may be used by a sender to protect original input content received by a component of network 110. Any known credential management service and related services providing these or similar functionalities may be implemented in the disclosed embodiments.

The processes of the example embodiments may be implemented at any one of the computing devices or systems shown in FIG. 1, including host computer 120, 122, proxy server 130, e-mail server 132, file server 134, content disarm server 136, firewall 140, cloud server 165, and credential management service 170a, 170b.

Figure 2:
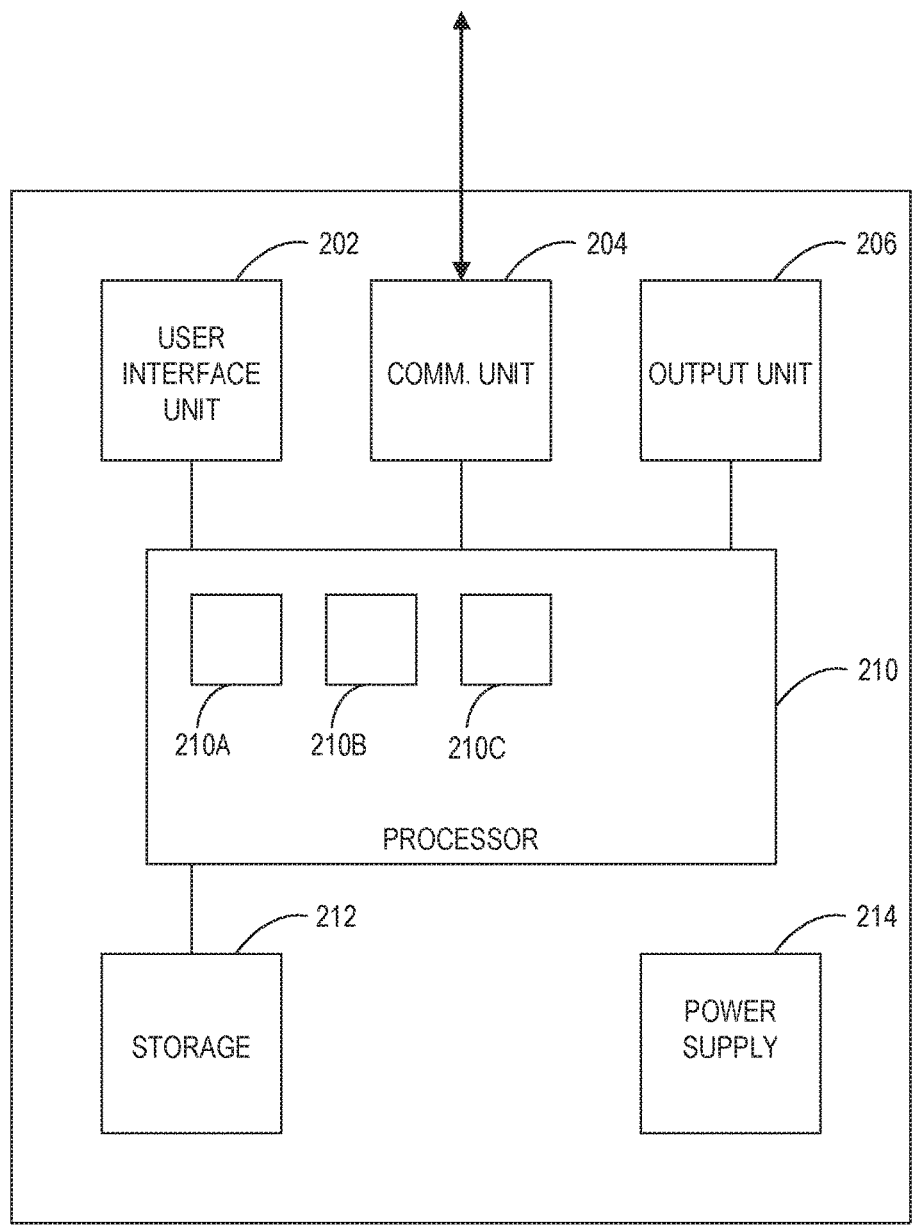
FIG. 2 is a schematic block diagram of an example computing system adapted to perform aspects of the disclosed embodiments.

Reference is now made to FIG. 2, which is a schematic block diagram of an example computing system 200 adapted to perform aspects of the disclosed embodiments. According to the example embodiments, computing system 200 may be embodied in one or more computing components of computing environment 100. For example, computing system 200 may be provided as part of host computer 120,122, proxy server 130, e-mail server 132, file server 134, content disarm server 136, cloud server 165, or credential management service 170a/170b, for example. In some embodiments, computing system 200 may not include each element or unit depicted in FIG. 2. Additionally, one of ordinary skill in the art would understand that the elements or units depicted in FIG. 2 are examples only and a computing system according to the example embodiments may include additional or alternative elements than those shown.

Computing system 200 may include a controller or processor 210, a user interface unit 202, communication unit 204, output unit 206, storage unit 212 and power supply 214. Controller/processor 210 may be, for example, a central processing unit processor (CPU), a chip or any suitable computing or computational device. Controller/processor 210 may be programmed or otherwise configured to carry out aspects of the disclosed embodiments.

Controller/processor 210 may include a memory unit 210A, which may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable computer-readable memory units or storage units. Memory unit 210A may be or may include a plurality of possibly different memory units.

Controller/processor 210 may further comprise executable code 210B which may be any executable code or instructions, e.g., an application, a program, a process, task or script. Executable code 210B may be executed by controller 210 possibly under control of operating system 210C. For example, executable code 210B may be an application that when operating performs one or more aspects of the example embodiments. Executable code 210B may also include one or more applications configured to render input content, so as to open, read, edit, and otherwise interact with the rendered content. Examples of a rendering application include one of various Microsoft® Office® suite of applications, a PDF reader application or any other conventional application for opening conventional electronic documents, as well as a web browser for accessing web content.

User interface unit 202 may be any interface enabling a user to control, tune and monitor the operation of computing system 200, including a keyboard, touch screen, pointing device, screen, and audio device such as loudspeaker or earphones.

Communication unit 204 may be any communication supporting unit for communicating across a network that enables transferring, i.e. transmitting and receiving, digital and/or analog data, including communicating over wired and/or wireless communication channels according to any known format. Communication unit 204 may include one or more interfaces known in the art for communicating via local (e.g., first network 110) or remote networks (e.g., network 150) and or for transmitting or receiving data via an external, connectable storage element or storage medium.

Output unit 206 may be any visual and/or aural output device adapted to present user-perceptible content to a user, such as media content. Output unit 206 may be configured to display web content or, for example, to display images embodied in image files, to play audio embodied in audio files and present and play video embodied in video files. Output unit 206 may comprise a screen, projector, personal projector and the like, for presenting image and/or video content to a user. Output unit 206 may comprise a loudspeaker, earphone and other audio playing devices adapted to present audio content to a user.

Storage unit 212 may be or may include, for example, a hard disk drive, a floppy disk drive, a Compact Disk (CD) drive, a CD-Recordable (CD-R) drive, solid state drive (SSD), solid state (SD) card, a Blu-ray disk (BD), a universal serial bus (USB) device or other suitable removable and/or fixed storage unit. Data or content, including user-perceptible content may be stored in storage unit 212 and may be loaded from storage 212 into memory unit 210A where it may be processed by controller/processor 210. For example, memory 210A may be a non-volatile memory having the storage capacity of storage unit 212.

Power supply 214 may include one or more conventional elements for providing power to computing system 200 including an internal batter or unit for receiving power from an external power supply, as is understood by one of ordinary skill in the art.

Figure 3:
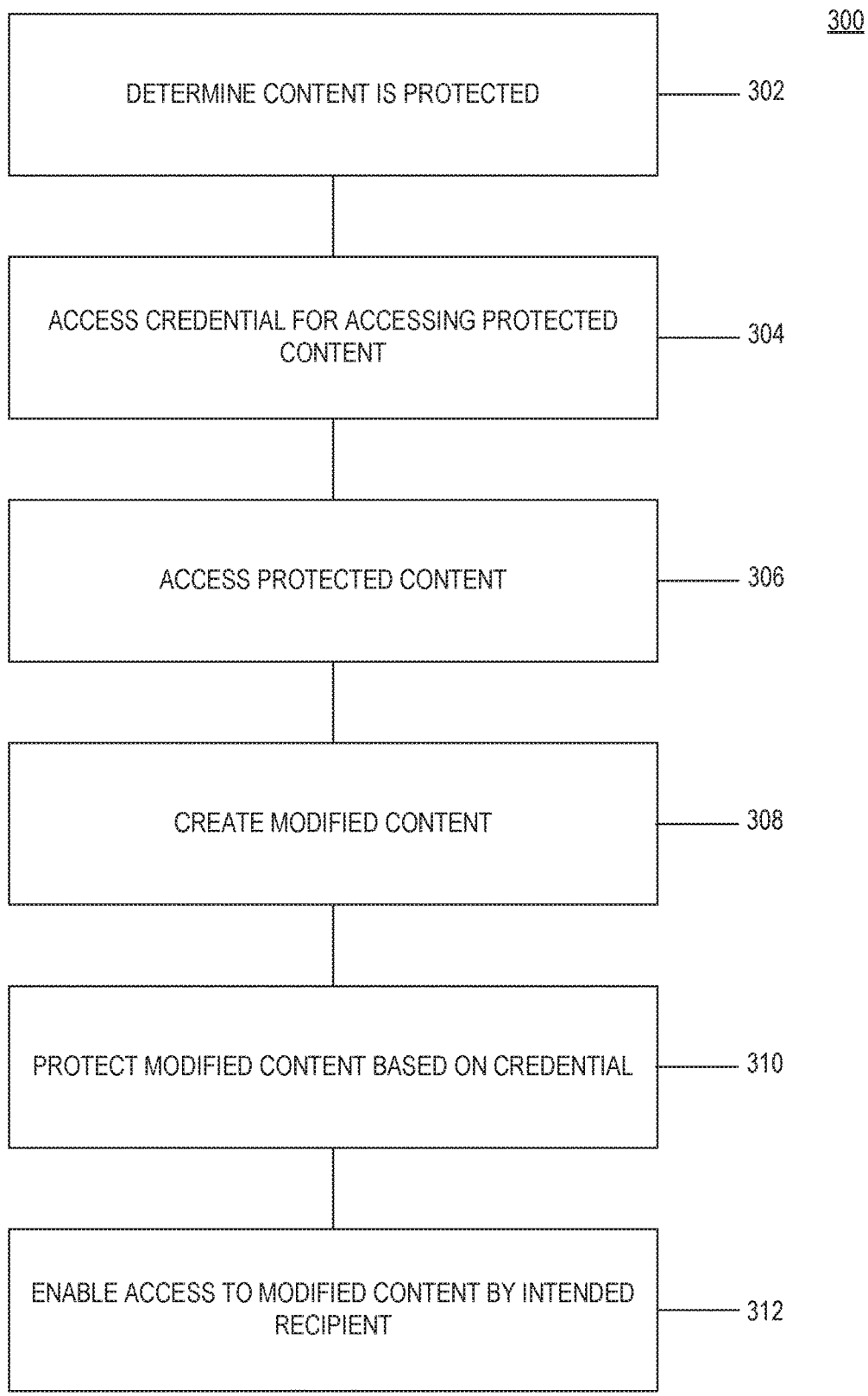
FIG. 3 is a flowchart of an example process for modifying protected content, consistent with the disclosed embodiments.

Reference is now made to FIG. 3, which is a flowchart of an example process 300 for modifying received original input content, which in the disclosed embodiments may include a communication or an input file or document received or accessed in an electronic communication. In some embodiments, the received original input content may include an e-mail communication. In the disclosed embodiments, the received original input content may be protected.

According to the example embodiments, implementation of process 300 may disarm or neutralize or otherwise prevent malicious content in received protected original input content, in whatever form, from being passed on to an intended recipient or computing device.

In an example embodiment, the input content is originally received or accessed by a computing system, such as computing system 200, which may be included in any of the computing elements in computing environment 100, including host computer 120, 122, proxy server 130, e-mail server 132, file server 134, content disarm server 136 or cloud server 165, for example. In some embodiments, for example, the input content is received by a host computer 120, 122 that may be operated by an end-user. In other embodiments, the input content may be intended for host computer 120, 122 (or requested by host computer 120, 122) and is received by an intermediary computing system, such as proxy server 130, e-mail server 132, or firewall 140. In some embodiments, the input content may be received by a file server 134 or cloud server 165. Additionally, or alternatively, the input content may be received or accessed by content disarm server 136, from any of the computing components within network 110 or in communication with network 110.

The input content may be received or accessed by computing system 200 by any means known in the art, including such as by importing locally via an external storage device, downloading or otherwise receiving from a remote web-server, file server, or content server, for example, or by receiving via e-mail or a web browser or any other means for accessing or receiving content. In some embodiments the input content may be received via a protected communications or file transport mechanism. An input file may be a file received or requested by a user of a computing system or other files accessed by processes or other applications executed on a computing system that may not necessarily be received or requested by a user of the computing system. In some embodiments, the input content may be received as an upload, such as part of an upload request to file server 134 or cloud server 165, for example.

Input (including, received) content according to the disclosed embodiments may include any form of electronic content, including a file, document, an e-mail, downloaded web content, etc., or other objects that may be run, processed, opened or executed by an application or operating system of the victim computer or computing device. An input file according to the disclosed embodiments may include any file or file-like content, such as an embedded object or script, that is processed, run, opened or executed by an application or operating system of a computing system. Input content may include electronic mail, for example, or streamed content or other web content. Thus, while some embodiments of the present disclosure refer to an input file or document, the disclosed techniques are also applicable to objects within or embedded in an input file or to input content generally, without consideration as to whether it can be characterized as a file, document, or object. The received content or file(s) may or may not include malicious content. Malicious content can be embedded among seemingly legitimate received content or input content.

According to some embodiments, one or more rules may be applied by the receiving computing system (or other intermediary computing system) to content or files according to known techniques for identifying trusted or potentially suspicious or malicious input files or otherwise suspicious or malicious content. For example, a preliminary analysis of a file or other content may include determining the source of the file, the file type, file structure, the process accessing the file, or any other characteristics associated with the file that may enable a determination as to a potential for a file to include malicious content. A preliminary analysis is optional, but in some embodiments it may be useful to first screen content for malicious content or characteristics known or suspected to be associated with malicious content or activity or otherwise suspicious content, without regard to whether the input content is protected.

The disclosed embodiments may be implemented with respect to any and all content identified in a document, file, or other received input content, without regard to whether the content or the document itself is deemed suspicious in advance or before the sanitization or modification is performed. Suspicious content may or may not include malicious content. Suspicious content refers, for example, to a situation where input content may potentially or more likely include malicious content, such as when the received content comes from or is associated with an untrusted source. Content may be deemed suspicious based on one or more characteristics of the received input content itself or the manner in which it is received, as well as other factors that alone or together may cause suspicion. One example of a characteristic associated with the input content refers to an authorship property associated with the input content. For example, the property may identify an author of the input content and the system determines whether the author property matches the source from which the input content was received and if there is no match then the system marks the input content as suspicious.

In the example embodiments, whether the input content is protected or not, any malicious or suspicious content included in a file or content can be disarmed without having first detected possible or suspected malicious or suspicious content. That is, it is not necessary to first detect any malicious or suspicious content in the content in order to disarm the malicious content. In some embodiments, one or more malware detection techniques may be implemented together with the exemplary embodiments, but knowledge or awareness of suspected malicious or suspicious content is not required to disarm any malicious content that may be included in the input content. In some embodiments, one or more malware detection techniques may be performed on protected content. For example, some rudimentary malicious content can be identified based on a signature of encrypted malicious content. Advanced malicious content may not be detectable in protected content, however, without first accessing the original content in decrypted or unprotected form.

In some embodiments, the disclosed content modification techniques may be performed when one or more malware detection techniques do not identify suspicious content or suspected malicious content in received input content in unprotected form. In some embodiments, received input content that is determined to include malicious content may be quarantined or otherwise blocked from being accessed by a user or intended recipient. Alternatively, in some embodiments, upon identifying suspicious or malicious content, various CDR processes may be performed to disarm the identified malicious content that may be included in the input content. Additionally, in some embodiments, if malicious content is identified, the example embodiments may include functionality for destroying such content that is known to be malicious, in lieu of performing a disarming process. In some embodiments, any received content determined to include malicious content may be quarantined or blocked, so as not to be accessed by the intended recipient altogether. One or more other known content screening or analysis techniques and policies or rules for evaluating the input content may be implemented in addition to those expressly described in the example embodiments.

The performance of particular aspects or operations of process 300 may be determined based on one or more policies or rules configured for computing system 200. For example, whether or not each step of process 300 is performed may be determined based on one or more policies or rules. The example embodiments for disarming input content (protected or not) are not limited to any particular enterprise computing environment or implementation, and can be implemented as a standalone solution or a suite of solutions, and can be customized according to preferences of a computing environment. The policies or rules may be based on a number of known factors, some of which may be enterprise specific and/or specific to an intended recipient or sender/class of senders. For example, in some embodiments, whether or not each step of process 300 is performed may be based on a particular rule or policy for handling input content that is determined to be protected. In some embodiments, protected input content may be selectively processed or not processed at all based on an identity of the intended recipient and or whether the sender belongs to a class of trusted senders.

At operation 302, the input content may be inspected or analyzed to determine that the input content is protected. For example, in some embodiments, it may be determined that the input content is encrypted or otherwise obscured or protected/prevented from being readily accessed. In some embodiments, one or more techniques may be implemented to attempt to access the input content, upon which it may be determined that the input content is protected or otherwise inaccessible.

At operation 304, responsive to determining that the input content is protected, computing system 200 may perform one or more operations to access a credential for accessing the original (e.g., unencrypted) digital values of the protected content.

In some embodiments, computing system 200 may coordinate or communicate with a credential management service 170a or 170b to access a credential needed for accessing the protected content. For example, in some embodiments, credential management service 170a or 170b may maintain one or more credentials used to protect content and access protected content for a plurality of users or intended recipients of network 110. In some embodiments, the one or more credentials include a public/private key pair associated with the intended recipient. Accordingly, a credential needed for accessing protected input content may be accessed or retrieved based on an identifier of the intended recipient, an identifier of the sender, and/or other metadata associated with the protected content, such as information identifying the nature of the input content or the protection service or mechanism for protecting the input content. In some embodiments, the credential needed for accessing protected input content may be obtained responsive to computing system 200 authenticating itself to credential management service 170a or 170b. In some embodiments, computing system 200 may be authenticated based on authentication credentials providing root or superuser privileges or based on individual authentication credentials managed on behalf of one or more users including the intended recipient of the received input content and/or the sender of the received input content.

In some embodiments, computing system 200 may access a needed credential or other information for accessing the content by requesting such a credential or other information from the intended recipient (or sender when the received content is part of an upload request). In some embodiments, computing system 200 may be configured to provide a notification to the intended recipient (or sender) requesting input of a credential for accessing the received input content. An example notification may include an electronic communication and/or a fillable form or interface identifying the received input content and enabling the intended recipient (or sender) to input or upload the credential or other information needed to access the received input content. In some embodiments, for example, a user may be requested to input a password for password-protected content, or other information from which a decryption key may be derived, and/or a decryption key itself. In some embodiments, the notification may include an alert or warning requesting the intended recipient to confirm that the received input content is expected content and/or the sender is a trusted sender. In some embodiments, such an alert or warning may be sent separate from any communication requesting input of a credential.

In some embodiments, computing system 200 may access a needed credential or other information for accessing the content based on the content of a communication associated with the input content intended for the recipient. Accordingly, computing system 200 may include capabilities for analyzing the content of a communication using text-based keyword searching, OCR techniques, or machine learning algorithms for identifying a potential credential or other information for obtaining the credential. For example, in some embodiments, a communication included with the input content, related to the input content, or otherwise associated with the input content may include a password or credential or other information (e.g., a hint or clue) from which a needed credential can be identified or determined. The communication may be the same communication including the received input content, or may be a communication preceding or subsequent to the communication including the received input content. The communication including the credential or other information for obtaining the credential may be received in the same or different channel as a communication including the received input content. Computing system 200 may then obtain the needed credential from the communication itself, or derive the needed credential based on information obtained from the communication, or access the needed credential from a credential management service 170a or 170b based on such information, for example.

At operation 306, computing system 200 may perform one or more operations to access the original (e.g., unencrypted) digital values of the protected content. In some embodiments, computing system 200 may access the original input content by decrypting (or otherwise unprotecting or unlocking) the protected content based on the accessed credential (operation 304). For example, when the received input content is password-protected, the original input content may be accessed using the password obtained in operation 304. The password may be a key for decrypting the encrypted protected content or the password may provide a basis for which a decryption key may be derived. While computing system 200 may include functionality for accessing the original input content, in some embodiments, credential management service 170a or 170b may include functionality for providing or otherwise enabling access to the original unprotected or unencrypted content. Thus, in some embodiments, steps for accessing the protected content include receiving the unprotected (e.g., unencrypted) content from a credential management service 170a or 170b (e.g., via an application programming interface associated with the service).

In some embodiments, computing system 200 may determine whether to create modified input content based on the received input content, responsive to accessing the original protected content in operation 306. In some embodiments, an enterprise policy may determine not to create modified input content, such as when the sender and/or intended recipient and/or a nature of the protected content provides reasonable assurances as to the safety of the received input content. This may be especially true when the sender is trusted by the computing system 200 and/or network 110. However, it may be advantageous to perform one or more CDR or data sanitization operations on the accessed content without regard to the identity of the sender or a nature of the protected content. This is especially true because there can be little assurance that a trusted sender may unwittingly send malicious content. Additionally, in some embodiments, modified input content may not be created and the input content may be quarantined or discarded if the original protected content cannot be accessed.

In some embodiments, each input file or each input file of a predetermined type, etc., or all original input content or input content having certain characteristics that is received by a computing system 200 may be processed according to an example process 300, without regard to the characteristics of the input files and input content, such as an identity of a sender or recipient. In some embodiments, one or more malware detection algorithms may be applied to the received (and accessed) protected input content after or as part of operation 306, and operation 308, 310, and/or 312 is performed only if no suspicious or malicious content is detected. This is advantageous because the disclosed embodiments do not assume that any input content is safe or trusted, based on a preliminary analysis of the input file (if performed) or otherwise. This improves the likelihood of disarming malicious content that may be included in the input content without knowledge by the sender, and for disarming malicious content that may go undetected by conventional malware detection techniques.

As part of operation 308, computing system 200 may execute a program or instructions or otherwise perform a process to disarm any malicious content that may be included in the accessed input content, thereby creating modified input content. Any one or more CDR techniques, such as those identified above, or other techniques for modifying or transforming input content so as to prevent malicious content from being received by an intended recipient may be implemented. For example, in some embodiments, a modified input file may be created to include modified payload content in place of the original payload by changing the values of the underlying payload data units of the input content, such as according to the techniques of U.S. Pat. No. 9,047,293 and U.S. patent application Ser. Nos. 15/441,860 and 15/441,904, the contents of which are expressly incorporated herein. In some embodiments, the modified input content may include other structural changes to the received input content. For example, a header of a received input content or file may be changed in a modified input content or file. A modified input file may also be encoded or compressed or undergo any number of other changes to a structure, layout, or format of the input content, without preventing materially similar uses and functionality as the received input content. In some embodiments, computing system 200 may modify one or more aspects of the received input content, or all aspects. In some embodiments, computing system 200 may modify the input content according to one or more techniques for generating a visual representation of the input content.

In some embodiments, the particular disarming technique implemented may be based on the type of input content received. Thus, as part of operation 308, computing system 200 may read, scan, or parse the data units of the received input content according to techniques known in the art to determine the type or structure of the received input content. In some embodiments, operation 308 may include additional operations for determining other characteristics of the input content to aid the disarming process for creating modified input content.

In some embodiments, a reading, scanning or parsing process may be performed without invoking an execution engine such as application software of the computing system 200 for rendering the input content. For example, in some embodiments, computing system 200 does not render the input content, as such rendering of input content may result in triggering execution of malicious content. In an example embodiment, input content may include one or more input files or objects etc. In such an embodiment, each distinct file, object, or content of the received input content may be parsed one by one in separate iterative processes to identify any malicious content included in received input content. In other embodiments, aspects of operation 308 may be performed in an isolated or monitored environment such as a sandbox or sandbox type environment. Other transformation or modification techniques may also be implemented to create modified input content.

In some embodiments, as part of operation 308, the modified input content is created as a new file or document or email or other representation, distinct from the received original protected input content. In some embodiments, the modified input content is configured to be rendered by a user using a rendering application just as (or similar as) the received input content would be rendered by the user. In some embodiments, the modified input content may also be configured to enable full functionality or intended use as the received original input content.

As part of operation 308, additional content features may be inserted into or added to the modified input content that provide an indication that the original input content has undergone processing to disarm malicious content, or has otherwise been modified. The content features may include elements inserted into the modified content itself, or alternatively, may be displayed within an electronic communication associated with the modified input content. The content features may be configured to be displayed or otherwise provided to the intended recipient upon receipt of the modified input content or rendering of the modified input content. In some embodiments, other content features may also be added such that an intended recipient can distinguish modified input content from other content, such as the original input content.

Responsive to creating the modified input content as part of operation 308, computing system 200 may determine whether to re-protect (e.g., encrypt) the modified input file, as part of operation 310. As with other steps of process 300, performance of operation 310 is optional and it may be determined based on one or more configurable policies of computing system 200 or network 110. In some embodiments, operation 310 may be based on the identity of a sender or recipient or based on the nature or characteristic of the original protected input content. In some embodiments, performance of operation 310 may be predetermined or individually selectable by an administrator of network 110 or upon request by an intended recipient or other requesting entity.

As part of operation 310, computing system 200 may protect the modified input content. In some embodiments, the modified input content may be protected based on the same protection technique as implemented for the received input content. Where the received input content is password-protected, for example, the modified content may also be password-protected. The password used to protect the modified input content may be the same password accessed in operation 304, or may be a different unique password. In some embodiments, for example, the password used to protect the modified input content may be a secure password used by the intended recipient to access network 110 and known to an administrator of network 110, such as a network login password or SSO password, etc. In other embodiments, the modified input content may be re-encrypted based on an encryption key used to encrypt the original received protected content, such as, for example, when the credential accessed in operation 304 is a symmetric key, or when the key used to encrypt the original received protected content is a public key associated with a private key of the intended recipient. Any of a number of other techniques for re-protecting the modified input content, such that it is accessible to a requesting user or intended recipient may also be implemented.

In some embodiments, in addition to or in lieu of protecting the modified input content, a digital signature may be applied or associated with the modified input content. A digital signature may be created, for example, as part of operation 310 and may include any type of digital signature providing one or more of the capabilities for verifying integrity of the contents of the modified input file, or for verifying an identity of a sender, or for confirming a chain of possession of the modified input content. In some embodiments, a digital signature created as part of operation 310 may serve to verify the identity of a network administrator of network 110 or a security gateway of network 110 or other entity trusted by network 110 or computing system 200. In this regard, any one or more techniques may be implemented, such as the use of a private/public key encryption algorithm or other security certificate for example. The digital signature created in operation 310 may also include capabilities for verifying the contents of the modified input content based on a hash or other uniquely identifying characteristic. Additionally, a digital signature created as part of operation 310 may also include additional information identifying a particular CDR technique implemented to create the modified input content, or a report identifying one or more changes to the input content, as well as other information identifying the nature of the techniques for protecting the original input content or any validation information of a sender of the original input content that may be determined based on the techniques for protecting the original input content.

At operation 312, computing system 200 may enable access to the modified input content. By, for example, protecting the modified content using a credential associated with the intended recipient, the system enables the intended recipient in this example with access to the modified content. In some embodiments, the modified input content (re-protected or otherwise) may be provided or forwarded to a recipient computing device such as host computer 120, 122, or a file server 134 or other computing device of computing environment 100. Operation 312 may be performed in those embodiments where process 300 is performed by a computing device or system other than an intended recipient of the input content, for example. In some embodiments, operation 312 may be performed before operation 310, such as when operation 310 is not performed. In embodiments where process 300 is performed at a host computer 120, 122, or a cloud server 165, for example, operation 312 may not be performed. Additionally, in some embodiments, modified input content may be forwarded to one or more other computing devices or systems intermediate or alternative to an intended recipient computing device. In the example embodiments, the modified input content may be rendered at the recipient computing device to a human user using known rendering applications for interacting with the input content, or may otherwise be accessed, opened, processed, stored, etc. at the recipient computing device by the user or other process executing at the recipient computing device. In some embodiments, the modified input content may be made accessible responsive to creation of the modified input content (operation 308) or responsive to protecting the modified content (operation 310). In some embodiments, access to the modified input content and/or the original protected input content may be enabled after a predetermined period of time.

In some embodiments, computing system 200 may associate the modified input content with the received original protected input content. In some embodiments, all or certain types of the received original input content, a copy thereof, or other characteristic (e.g., a hash, URL, any other identifier, etc.) of the original input content may be stored and/or logged in a dedicated repository or protected storage area, such as part of file server 134, content disarm server 136, cloud server 165, or one or more other databases or storage systems. In some embodiments, a report illustrating the extent of modifications included in the modified content and how any malicious content included therein may have been disarmed, may also be stored in association with the received original input content or modified input content. Once created as a result of operation 308, the created modified input content may be stored or indexed together with the original received input content (protected or unprotected) in the document repository or protected storage area, or otherwise associated with the original input content. The modified input content created for each of the stored and logged original input content may be associated with the original input content according to any number of techniques available in the art. For example, the modified input content or an identifier of the created modified input content may be stored in association with the original input content or otherwise linked with the original input content. Other techniques are contemplated that generally establish an association between an original input content and a modified input content.

As described above, the dedicated repository may be isolated or otherwise secured or protected to prevent general access to the original input content stored therein and/or to prevent any malicious content that may be included in the original input content from affecting other computing elements of a computer system. Thus, in the disclosed embodiments, the original input content may be quarantined such that it does not pose an active threat to a computer system. In some embodiments, however, the original content may be released (selectively or automatically) to certain users or intended recipients according to one or more policies of the computer system. Thus, by storing the original input content, an intended recipient or other user may be able to retrieve such original content at a later time if the original content is determined to be safe or "trusted" according to one or more procedures or policies, or is otherwise required by a requesting entity.

Upon request to an administrator, for example, the original input content may be obtained by a requesting user, such as the intended recipient, or other requesting entity that may be authorized to access such content according to policy of the enterprise. In some embodiments, the administrator may be restricted from releasing the original input content (protected or unprotected) unless certain rules or policies are met. Additionally, in some embodiments, an administrator may trigger a retrospective analysis of one or more original content items in response to the request, so as to identify any suspected malicious content that may have been included in the original input content at the time of receipt that may have gone undetected at the time of receipt. Example processes for performing a retrospective analysis of original input content are described in U.S. patent application Ser. No. 15/672,037, filed Aug. 8, 2017, the contents of which are expressly incorporated herein.

In some embodiments, a requesting user may be required to answer one or more prompts or pre-defined questions as part of the request or in response to requesting the release of original content. The one or more prompts maybe configured based on a nature of the original protected content, such as based on an identity of a sender of the content or the mechanism for protecting the content. An individual, such as an administrator, or automated system may then determine whether to release the original input content based at least in part on the user's responses, as well as other characteristics of the original input content. Some example prompts may include "were you expecting that file?" or "are you familiar with the sender?" etc. In some embodiments, the pre-defined prompts or questions may be tailored based on one or more characteristics of the original input content. In some embodiments, the pre-defined prompts may include an indication that the original protected content was not able to be accessed based on any credential accessed in operation 304. In such cases, additional prompts may be provided requesting the input of additional or alternative credential information.

In some embodiments, computing system 200 may be configured to automatically release original input content or replace modified input content with the original content if or once the original input content (protected or unprotected) is determined to be safe or "trusted". In some embodiments the content may be deemed safe based on one or more malware detection techniques or based on other policies associated with computing system 200. In some embodiments, once the original content is determined to be safe or "trusted", the original input content may be automatically forwarded to the intended recipient or the intended recipient may otherwise be notified that the original input content is accessible to the intended recipient.

The foregoing description describes example embodiments for disarming malicious code in original input content by generating modified input content. The above techniques, however, may also be applied for systems that perform one or more malware detection algorithms but do not necessarily generate modified input content. For example, in lieu of creating modified content in operation 308, some embodiments may analyze the accessed protected content based on one or more malware detection algorithms to identify if the accessed protected content includes suspected malicious content. If the accessed protected content is deemed safe or trusted, the accessed protected content may be re-protected (as similarly described with respect to operation 310), or may be forwarded to the intended recipient or otherwise made accessible (as similarly described with respect to operation 312). Additionally, any of the several techniques may be combined in any one embodiment depending on the nature of the input content, and one or more network or enterprise rules or policies, for example.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. Thus, while certain features of the example embodiments have been illustrated and described herein, many modifications, substitutions, changes, and equivalents will be apparent to those of ordinary skill in the art. It is, therefore, to be understood that the appended claims are intended to cover all such modifications and changes as fall within the true spirit of the invention.

The claims are to be interpreted broadly based on the language used in the claims and not limited to examples described in the present specification, which are non-exclusive. For example, aspects of the disclosed embodiments are described as operations performed by a computing system, and one skilled in the art will appreciate that these aspects can be configured as a set of instructions stored on and executed from many types of tangible computer-readable media, such as secondary storage devices, like hard disks, floppy disks, or CD-ROM, or other forms of RAM or ROM.

What is claimed is:

1. A method of disarming malicious code in protected content in a computer system having a processor, the method comprising:

determining, by the processor, that a received input file intended for a recipient is protected;

accessing a credential associated with the intended recipient for accessing the protected input file;

accessing, by the processor, the content of the protected input file based on the credential;

modifying, by the processor, at least a portion of digital values of the content configuring to disable any malicious code included in the content without intentionally altering non-malicious functionality of the received input file, thereby creating a modified input file, wherein the modified input file is modified to be substantially similar to the received input file; and protecting, by the processor, the modified input file based on the credential associated with the intended recipient.

2. The method of claim 1, further comprising enabling access to the modified input file by the intended recipient.

3. The method of claim 2, further comprising providing a notification to the intended recipient that the modified input file includes modified content.

4. The method of claim 3, wherein the notification is included in content of the modified input file.

5. The method of claim 3, wherein the notification is included in a communication associated with the modified input file.

6. The method of claim 5, wherein the communication is an electronic message including the modified input file attached thereto.

7. The method of claim 2, further comprising:
storing the protected input file in a dedicated storage area of the computer system; and
enabling access to the content by the intended recipient according to a policy of the computer system.

8. The method of claim 1, wherein accessing the credential includes requesting the credential from the intended recipient.

9. The method of claim 1, wherein accessing the credential includes determining the credential based on a content of a communication associated with the input file intended for the recipient.

10. The method of claim 1, wherein determining that the input file is protected includes determining that the input file is password-protected.

11. The method of claim 10, wherein the credential associated with the intended recipient is a password for accessing the content of the protected input file.

12. The method of claim 10, wherein protecting the modified input file includes password-protecting the modified input file based on the password.

13. The method of claim 1, wherein determining that the input file is protected includes determining that the input file is encrypted.

14. The method of claim 13, wherein the credential associated with the intended recipient is a private key for decrypting the input file.

15. The method of claim 13, wherein the private key is stored by a gateway in the network.

16. The method of claim 14, wherein protecting the modified input file includes encrypting the modified input file using a public key associated with the intended recipient.

17. The method of claim 1, wherein accessing the content of the protected input file includes decrypting the protected input file based on the credential.

18. A method of disarming malicious code in protected content in a computer system having a processor, the method comprising:
determining, by the processor, that a received content intended for a recipient is protected;
accessing, by the processor, a credential for accessing the protected content;
accessing, by the processor, the digital values of the protected content based on the credential;
modifying, by the processor, at least a portion of the digital values of the content configuring to disable any malicious code included in the content without intentionally altering non-malicious functionality of the received content, thereby creating modified content, wherein the modified content is modified to be substantially similar to the received content; and
enabling access to the modified content by the intended recipient.

19. The method of claim 18, further comprising, before enabling access to the modified content, protecting, by the processor, the modified content based on the credential.

20. The method of claim 18, wherein the received content includes at least one of an electronic message or a file.

21. The method of claim 18, wherein the modifying is performed without first detecting malicious code in the digital values of the received content.

22. A non-transitory computer-readable medium comprising instructions that when executed by a processor are configured for carrying out the method of claim 18.

23. A system for disarming malicious code in protected content, the system comprising:
a memory device storing a set of instructions; and
a processor configured to execute the set of instructions to:
determine that a received content intended for a recipient in a network is protected;
access a credential for accessing the protected content;
access the digital values of the protected content based on the credential;
modify at least a portion of the digital values of the content configuring to disable any malicious code included in the content without intentionally altering non-malicious functionality of the received content, thereby creating modified content, wherein the modified content is modified to be substantially similar to the received content; and
enable access to the modified content by the intended recipient.

* * * * *